US010321050B2

(12) United States Patent
Bostick et al.

(10) Patent No.: US 10,321,050 B2
(45) Date of Patent: Jun. 11, 2019

(54) DETERMINING OPTIMAL PHOTOGRAPH CAPTURE TIMING BASED ON DATA FROM WEARABLE COMPUTER EYEWEAR DEVICES

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

(21) Appl. No.: 15/363,549

(22) Filed: Nov. 29, 2016

(65) Prior Publication Data
US 2018/0152627 A1 May 31, 2018

(51) Int. Cl.
H04N 5/232 (2006.01)
G06K 9/00 (2006.01)

(52) U.S. Cl.
CPC ..... H04N 5/23219 (2013.01); G06K 9/00597 (2013.01); H04N 5/23206 (2013.01); H04N 5/23222 (2013.01); G06K 9/00308 (2013.01)

(58) Field of Classification Search
CPC ........... H04N 5/23219; H04N 5/23203; G06K 9/0061; G02C 7/04
See application file for complete search history.

(56) References Cited

U.S. PATENT DOCUMENTS

| 7,233,684 B2 | 6/2007 | Fedorovskaya et al. |
| 8,994,847 B2 | 3/2015 | Chen et al. |
| 2009/0066803 A1 | 3/2009 | Miyata |
| (Continued) | | |

FOREIGN PATENT DOCUMENTS

| EP | 2360620 | 8/2011 |
| WO | 2007097777 | 8/2007 |
| (Continued) | | |

OTHER PUBLICATIONS

Mell et al., "The NIST Definition of Cloud Computing", NIST, Special Publication 800-145, Sep. 2011, 7 pages.

Primary Examiner — Mekonnen D Dagnew
(74) Attorney, Agent, or Firm — Brian Restauro; Andrew D. Wright; Roberts Mlotkowski Safran Cole & Calderon, P.C.

(57) ABSTRACT

A computer-implemented method includes: receiving, by a computing device, criteria for timing a capture of a photograph by an associated camera device; receiving, by the computing device, an instruction to capture the photograph at a time determined based on the criteria; obtaining, by the computing device, information regarding a status of one or more photograph participants from one or more wearable computing devices worn by the one or more photograph participants; determining, by the computing device, the time to capture the photograph based on the criteria and the status of the one or more photograph participants; and capturing, by the computing device, the photograph at the determined time.

13 Claims, 7 Drawing Sheets

(56) References Cited

U.S. PATENT DOCUMENTS

| | | | |
|---|---|---|---|
| 2009/0167881 A1* | 7/2009 | Thorn | H04N 5/23219 |
| | | | 348/222.1 |
| 2012/0004511 A1 | 1/2012 | Sivadas | |
| 2012/0157200 A1* | 6/2012 | Scavezze | H04N 5/225 |
| | | | 463/31 |
| 2015/0256741 A1* | 9/2015 | Towal | H04N 5/23222 |
| | | | 348/222.1 |
| 2016/0022135 A1* | 1/2016 | Agarwal | A61B 3/113 |
| | | | 351/209 |
| 2017/0188805 A1* | 7/2017 | Pradeep | A61B 3/0025 |

FOREIGN PATENT DOCUMENTS

| | | |
|---|---|---|
| WO | 2011045422 | 4/2011 |
| WO | 2012116138 | 8/2012 |

\* cited by examiner

DETERMINING OPTIMAL PHOTOGRAPH CAPTURE TIMING BASED ON DATA FROM WEARABLE COMPUTER EYEWEAR DEVICES

BACKGROUND

The present invention generally relates to determining optimal photograph capture timing and, more particularly, to determining optimal photograph capture timing based on data from wearable computer eyewear devices.

Smartphones and smart cameras provide a convenient way for users to capture photographs of individuals and/or groups of individuals. It is generally desirable for individuals to be photographed such that the individuals' eyes are open and do not include excessive amounts of moisture (e.g., in an environment causing excess moisture in the individuals eyes, such as from wind, sun exposure in the eyes, allergies, etc.). In other situations, moisture in eyes may be considered acceptable (e.g., when the moisture corresponds to tears representing an emotion, such as surprise or joy).

SUMMARY

In an aspect of the invention, a computer-implemented method includes: receiving, by a computing device, criteria for timing a capture of a photograph by an associated camera device; receiving, by the computing device, an instruction to capture the photograph at a time determined based on the criteria; obtaining, by the computing device, information regarding a status of one or more photograph participants from one or more wearable computing devices worn by the one or more photograph participants; determining, by the computing device, the time to capture the photograph based on the criteria and the status of the one or more photograph participants; and capturing, by the computing device, the photograph at the determined time In an aspect of the invention, there is a computer program product for optimizing the timing for photographing one or more photograph participants. The computer program product comprises a computer readable storage medium having program instructions embodied therewith, the program instructions executable by a computing device to cause the computing device to: receive criteria for timing a capture of a photograph by an associated camera device; receive an instruction to capture the photograph based on satisfaction of the criteria; monitor a status of one or more photograph participants based on information received from one or more wearable computing devices worn by the one or more photograph participants; detect that the status of the one or more photograph participants satisfies the criteria; and capture the photograph based on the detecting.

In an aspect of the invention, a system includes: a CPU, a computer readable memory and a computer readable storage medium associated with a computing device; program instructions to receive criteria for timing a capture of a photograph by an associated camera device; program instructions to receive an instruction to capture the photograph based on satisfaction of the criteria; program instructions to monitor a status of one or more photograph participants based on information received from one or more wearable computing devices worn by the one or more photograph participants; program instructions to detect that the status of the one or more photograph participants satisfies the criteria; and program instructions to provide an alert indicating that the criteria have been met based on the detecting. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
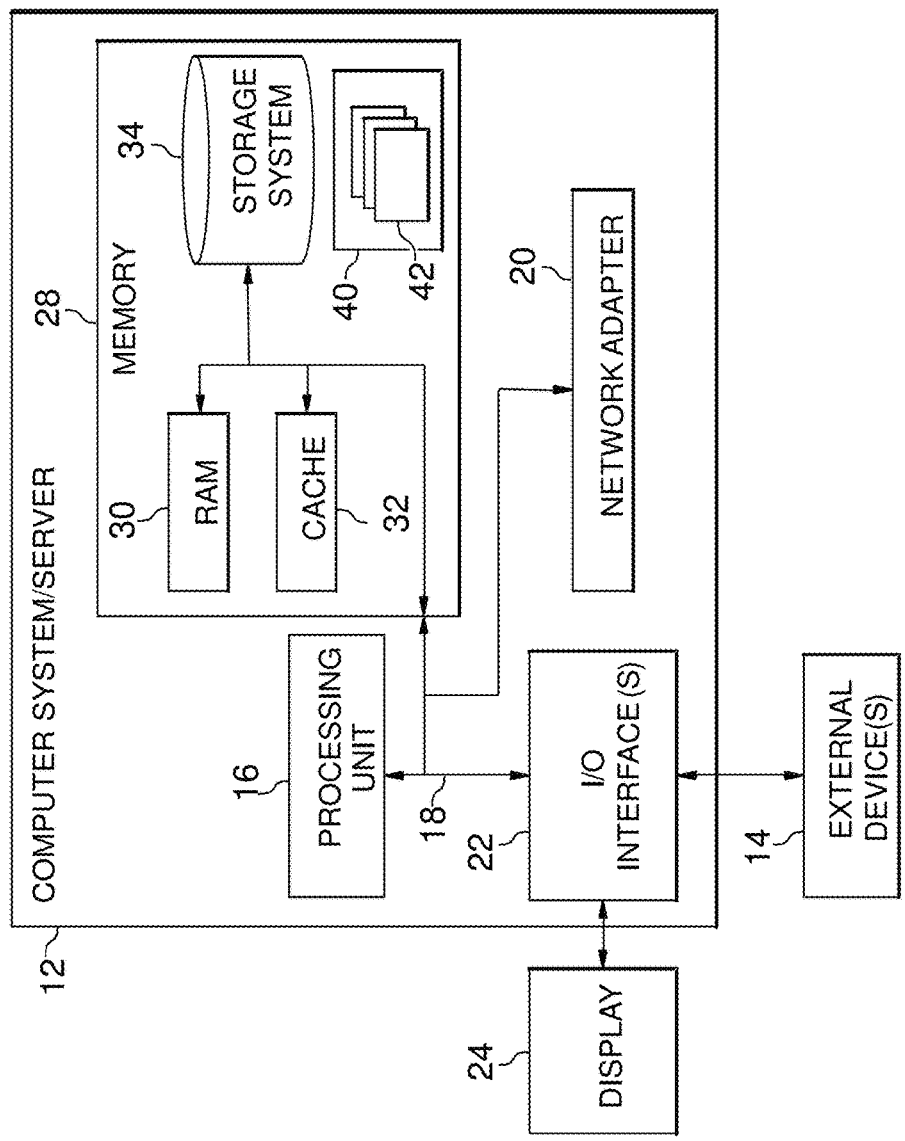
FIG. 1 depicts a cloud computing node according to an embodiment of the present invention.

The present invention generally relates to determining optimal photograph capture timing and, more particularly, to determining optimal photograph capture timing based on data from wearable computer eyewear devices. In accordance with aspects of the present invention, a camera device (e.g., a smartphone, a smart camera, or the like) may optimize the timing for when a photograph of one or more individuals is taken based on, for example, data from wearable computing devices worn by the individuals. More specifically, the camera device may obtain data relating to blinking patterns/rates from a wearable computing device, such as wearable computing eyewear (e.g., smart contact lenses or smart glasses). Additionally, or alternatively, the camera device may obtain data relating to moisture level patterns from the wearable computing device.

Based on such data from wearable computing devices, the camera device may predict the optimal time for capturing an image of one or more individuals. For example, the camera device may include an optimal photograph capture timing component that determines a time when specific criteria are met for capturing a photograph (e.g., criteria such as when all individuals eyes are open based on the blinking pattern of the individuals or when the eye moisture level of certain individuals satisfies a threshold based on the moisture level patterns). In this way, photos are captured in accordance with criteria defined by an originating user. As a specific example, a photograph may be captured such that the individuals in the photograph are not blinking (e.g., eyes are open). Additionally, or alternatively, a photograph may be captured such that the moisture levels of the individuals' eyes are at a configurable acceptable level. For example, a relatively lower eye moisture level may be considered acceptable in certain situations (e.g., when the eye moisture level is caused by factors such as wind, allergies, etc.), whereas a higher moisture level may be considered acceptable in other situations (e.g., when the eye moisture level is attributed to an emotion that induces tears, such as joy, surprise, etc.).

As described herein, the photograph may be captured based on real-time blink rate information and/or eye moisture level information as deciphered by data obtained from wearable devices. Additionally, or alternatively, the photograph may be captured based on historical blink rate information and/or eye moisture level information for a user that is stored by a user information server. As described herein, information from a wearable device may be used to uniquely identify the user in order to look up the user's historical blink rate information and/or eye moisture level information from the user information server.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
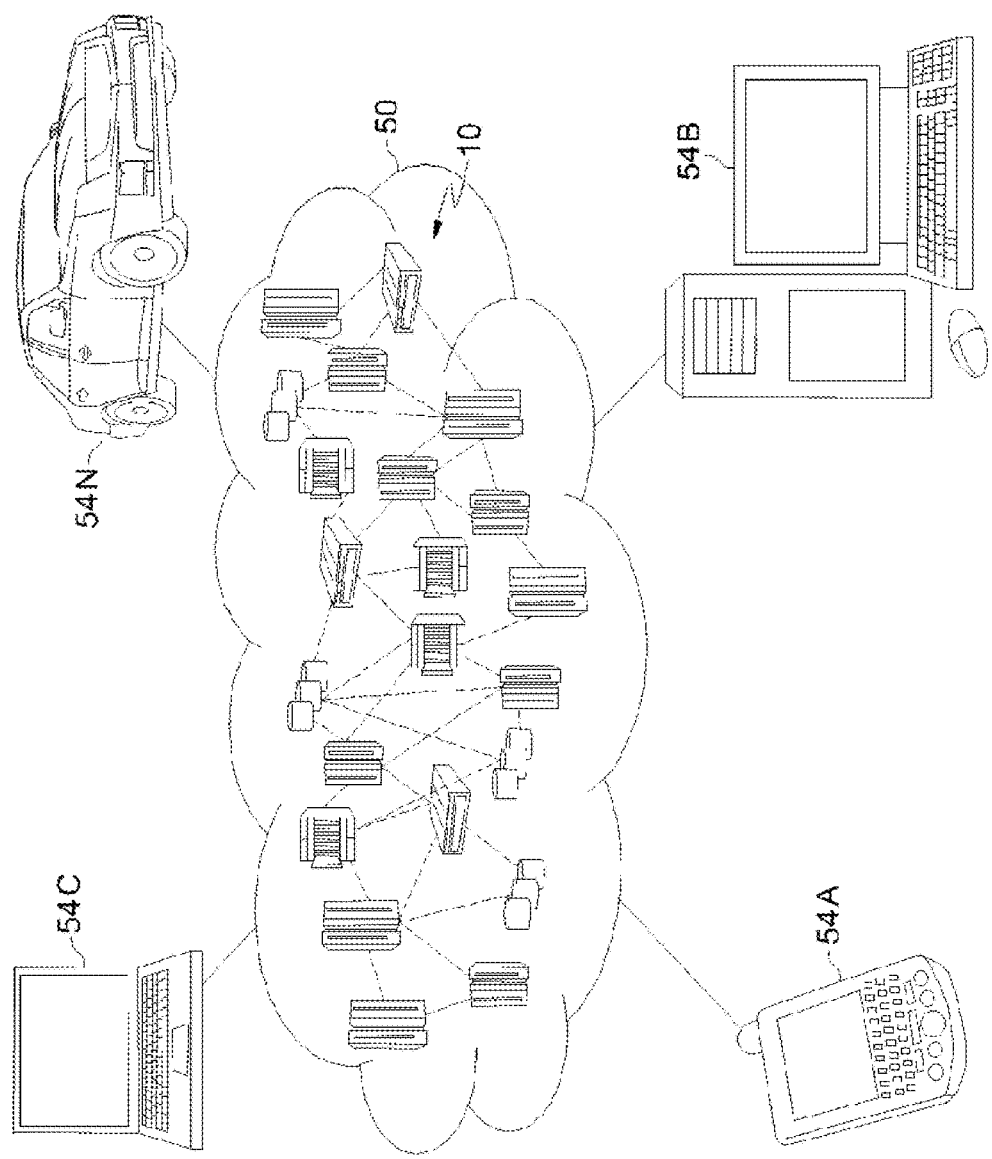
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
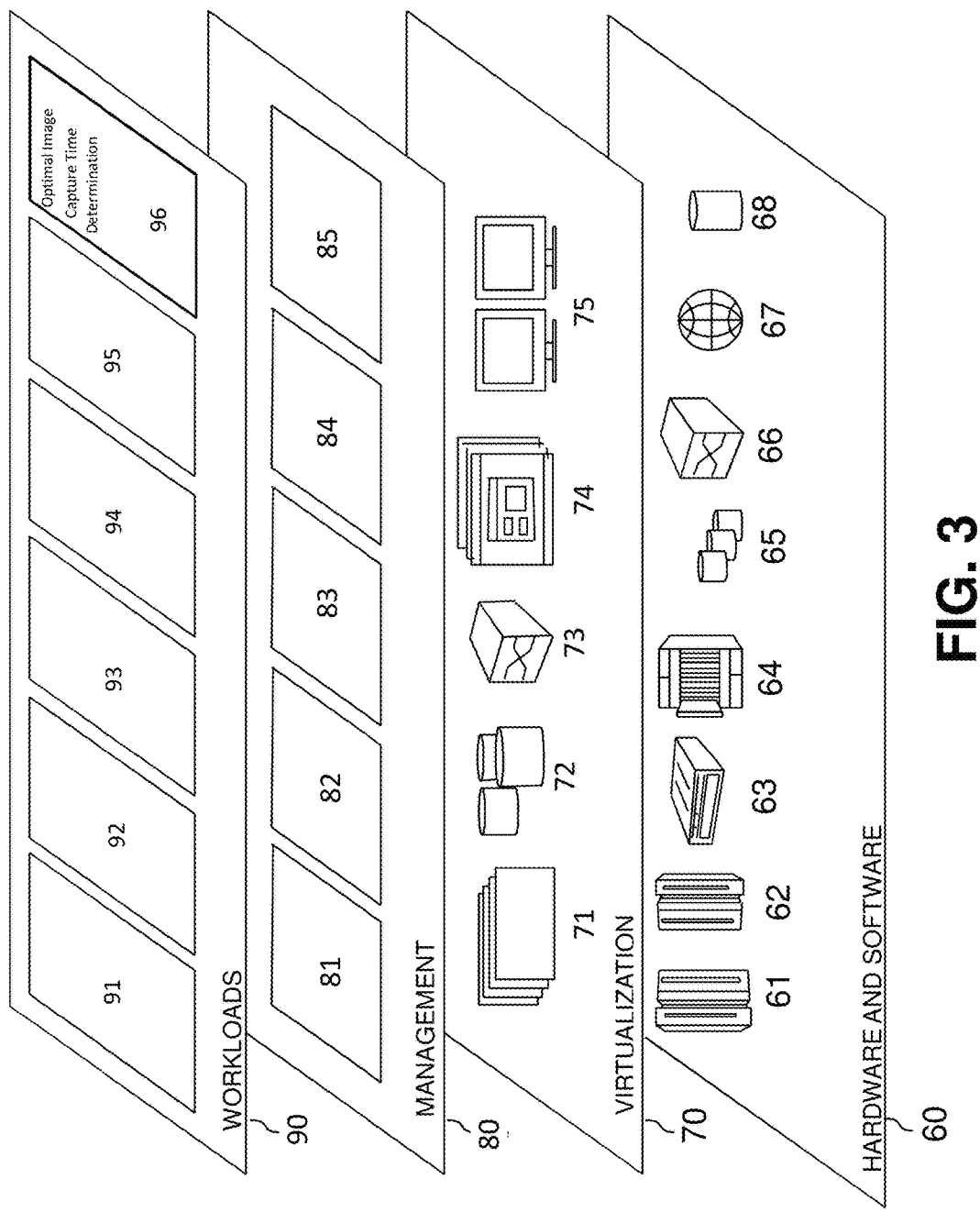
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimal image capture time determination 96.

Referring back to FIG. 1, the program/utility 40 may include one or more program modules 42 that generally carry out the functions and/or methodologies of embodiments of the invention as described herein (e.g., such as the functionality provided by optimal image capture time determination 96). Specifically, the program modules 42 may identify photograph participants, obtain real-time and/or historical blink rate information for the participants, obtain real-time and/or eye moisture level information for the participants, determine and execute an optimal time to capture a photograph based on the blink rate information and/or the eye moisture level information, capture a group of photos at the optimal time, evaluate the captured photos, and present the group of photos in order of quality. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a parking selection server as shown in FIG. 4.

Figure 4:
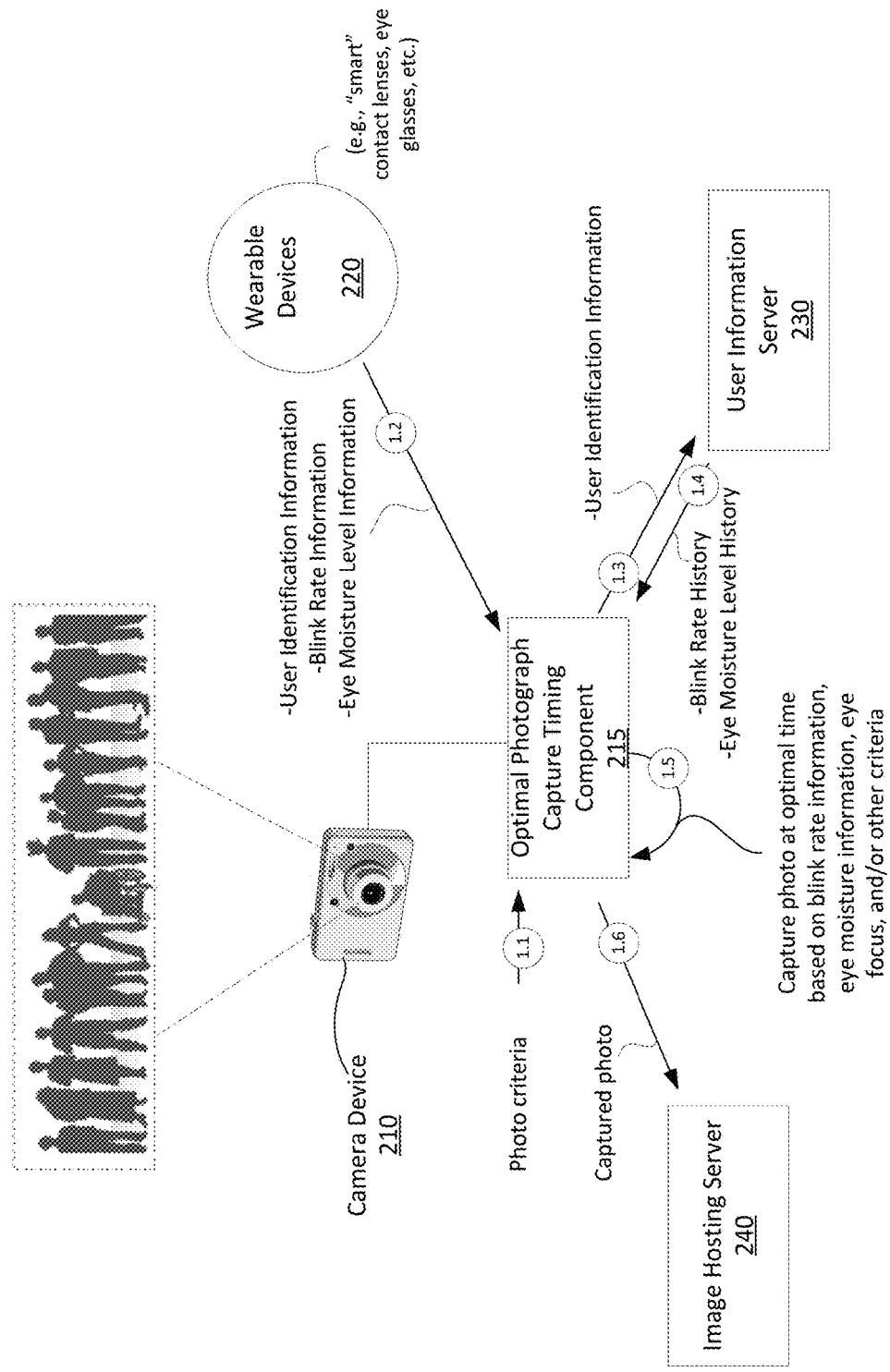
FIG. 4 shows an overview of an example implementation in accordance with aspects of the present invention

FIG. 4 shows an overview of an example implementation in accordance with aspects of the present invention. As shown in FIG. 4, a camera device 210 may be used to focus on a group of individuals (e.g., participants in a photograph) in order to capture a photograph of the participants. As described herein, participants of a photograph are considered to be individuals that are within a field of view of the camera device 210 or within the boundaries of a photograph to be captured by the camera device 210. At step 1.1, a user may provide photograph criteria to the camera device 210 (e.g., to an optimal photograph capture timing component 215 of the camera device 210). As described herein, the example photograph capture criteria may specify to capture a photograph when the eyes of all or particular individuals are open or closed, and when the eye moisture level of all or particular individuals satisfy a threshold. Other criteria may also be defined, such as certain facial/emotional expressions (e.g., smiling, laughing, etc.).

At step 1.2, the optimal photograph capture timing component 215 may receive information from wearable devices 220 regarding participants of a photograph. For example, wearable devices 220 may include "smart" eyewear, such as smart contacts lenses, smart glasses, or the like. Additionally, or alternatively, the wearable devices 220 may include other wearable, such as fitness bands, smart watches, or the like. In embodiments, the optimal photograph capture timing component 215 may receive, from the wearable devices 220, user information to uniquely identify a user wearing the wearable devices 220. The optimal photograph capture timing component 215 may receive user information for each different individual wearing wearable devices 220. Further, the optimal photograph capture timing component 215 may receive real-time blink rate information and/or real-time eye moisture level information for each individual wearing a wearable device 220 that is capable of providing the blink rate information and/or eye moisture level information. For example, smart contact lenses may include sensors, processor(s), a power source (e.g., battery), communications hardware (e.g., antenna) and/or other related hardware to provide both blink rate information and eye moisture level information along with user identification information. Smart glasses may only provide blink rate information along with user identification information. Smart fitness bands/watches may only provide user identification information, which, as described in greater detail below, may be used to obtain the user's historical blink rate information and/or historical eye moisture level information. As described herein, the blink rate information may include blinking patterns and rates for a user. The eye moisture level information may include eye moisture patterns for a user. The blink rate information and/or the eye moisture information may also be structured as to identify different blinking patterns/eye moisture patterns based on varying conditions (e.g., based on weather conditions, time of day, indoor/outdoor environments, etc.).

At step 1.3, the optimal photograph capture timing component 215 may provide the user identification information to a user information server 230, which may then provide historical blink rate information and historical eye moisture level information associated with the user identification information (at step 1.4). As described herein, the wearable devices 220 may provide blink rate information and/or eye moisture level information over a period of time in order for the user information server 230 to build a user profile containing the historical blink rate information and/or historical eye moisture level information for a user.

At step 1.5, the optimal photograph capture timing component 215 may capture a photograph at an optimal time based on real-time and/or historical blink rate information, real-time and/or historical eye moisture information, eye focus criteria (e.g., when the eyes of the individuals are focused in the image) and/or other criteria. As described herein, the optimal photograph capture timing component 215 may capture a photograph at an optimal time based on the satisfaction of the criteria of step 1.1. For example, assuming that the criteria specifies that all individuals' eyes are to be open, the optimal photograph capture timing component 215 may determine when all of the individuals' eyes are anticipated to be open based on the real-time and/or historical blink rate information. Further, assuming that the criteria specifies that moisture level of the individuals' eyes are not to exceed a certain level, the optimal photograph capture timing component 215 may determine when the eye moisture levels are anticipated to be at or below the specified level (e.g., based on the real-time and/or historical eye moisture level information). The optimal photograph capture timing component 215 may determine the satisfaction of other criteria, such as facial expressions of certain individuals (e.g., smiling expression, etc., as determined based on pixel-based classification techniques and/or other photograph analysis techniques).

Once the criteria have been satisfied, the optimal photograph capture timing component 215 may capture the photograph. Additionally, or alternatively, the optimal photograph capture timing component 215 may capture a "burst" of photos (e.g., a group of multiple photos) within a short period of time (e.g., a 5 second period of time). The optimal photograph capture timing component 215 may analyze the group of photos, score the photos based on the criteria based on a degree to which the photos satisfy the criteria, and present the photos (e.g., in a display of the camera device 210) in order of score. In embodiments, a captured photograph may be provided to an image hosting server 240 (at step 1.6). For example, the user of the camera device 210 may select to provide the captured photograph (or a selected photograph in a photograph burst) to the image hosting server 240 for sharing purposes. In embodiments, the captured photos may include tags identifying the individuals included in the photograph (e.g., using facial recognition techniques and/or the user identification information received by the wearable devices 220).

Figure 5:
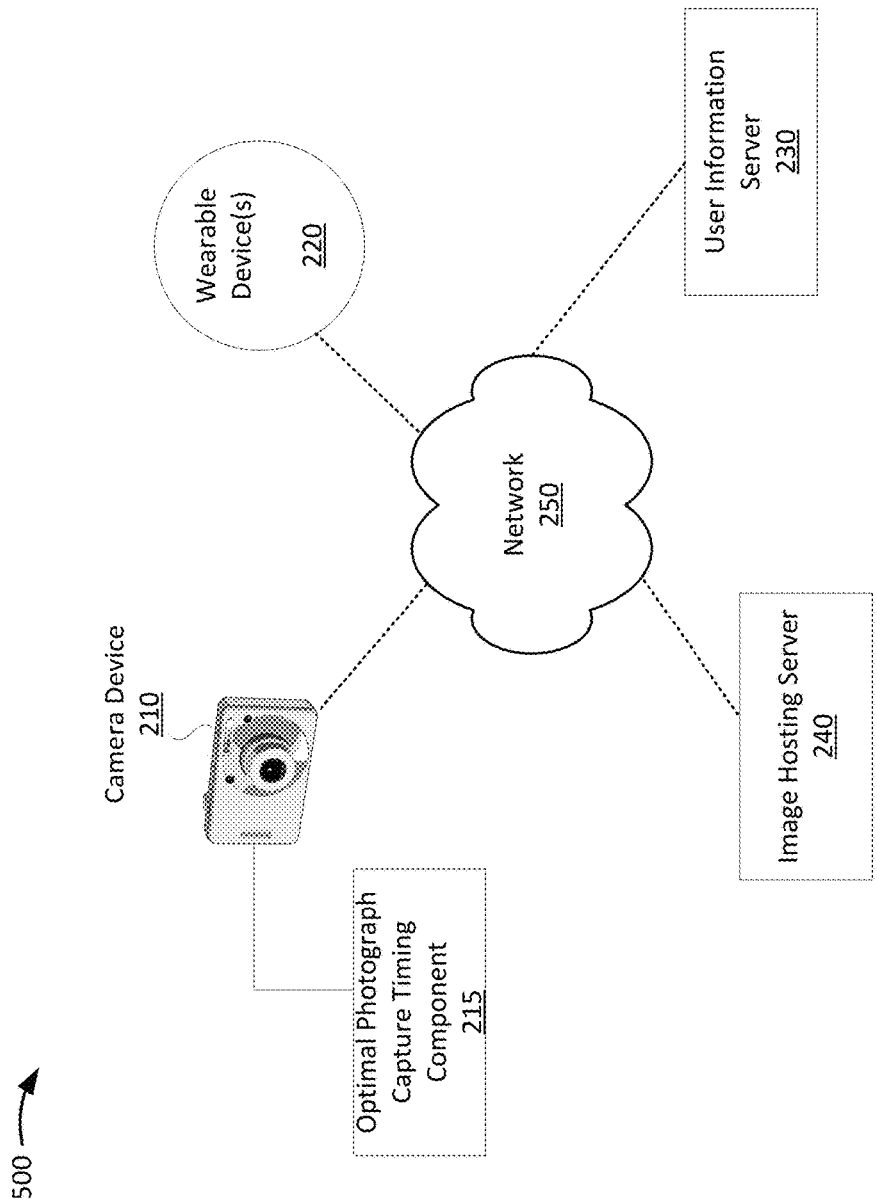
FIG. 5 shows an example environment in accordance with aspects of the present invention.

FIG. 5 shows an example environment in accordance with aspects of the present invention. As shown in FIG. 5, environment 500 may include a camera device 210, wearable devices 220, user information server 230, image hosting server 240, and network 250. In embodiments, one or more components in environment 500 may correspond to one or more components in the cloud computing environment of FIG. 2. In embodiments, one or more components in environment 500 may include the components of computer system/server 12 of FIG. 1.

The camera device 210 may include a device capable of capturing photos and communicating via a network, such as the network 250. For example, the camera device 210 may correspond to a smart digital camera, a smartphone, a portable computer device (e.g., a tablet computer), or another type of computing device. In some embodiments, the camera device 210 may include an optimal photograph capture timing component 215 that may determine the optimal time to capture a photograph based on a set of criteria, as describe herein (e.g., based on real-time and/or historical blink rate/pattern information, moisture level/pattern information, eye focus information, etc.).

The wearable devices 220 may include smart contact lenses, glasses, watches, fitness bands, or the like. The wearable devices 220 may provide biometrics data to the optimal photograph capture timing component 215 in connection with optimizing the timing for capturing a photograph. For example, the wearable devices 220 may provide user identification information for a user, real-time blink rate/pattern information for the user, real-time eye moisture level/pattern information for the user, real-time eye focus information, or the like. The wearable devices 220 may provide similar information to the user information server 230 in order for the user information server 230 to build a user profile identifying the user's historical blink rate/pattern information and/or eye moisture level/pattern information.

The user information server 230 may include on or more server devices (e.g., such as computer system/server 12 of FIG. 1) that receives and stores blink rate/pattern information and/or eye moisture level/pattern information for a user from the wearable devices 220. Over a period of time, the user information server 230 may build a user profile identifying the user's historical blink rate/pattern information and/or eye moisture level/pattern information.

The image hosting server 240 may include on or more server devices (e.g., such as computer system/server 12 of FIG. 1) that receives a photograph from the image hosting server 240 for hosting the photograph. In embodiments, the image hosting server 240 may be associated with an image hosting service provider, a social media service provider, or the like.

The network 250 may include network nodes, such as network nodes 10 of FIG. 2. Additionally, or alternatively, the network 250 may include one or more wired and/or wireless networks. For example, the network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 250 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
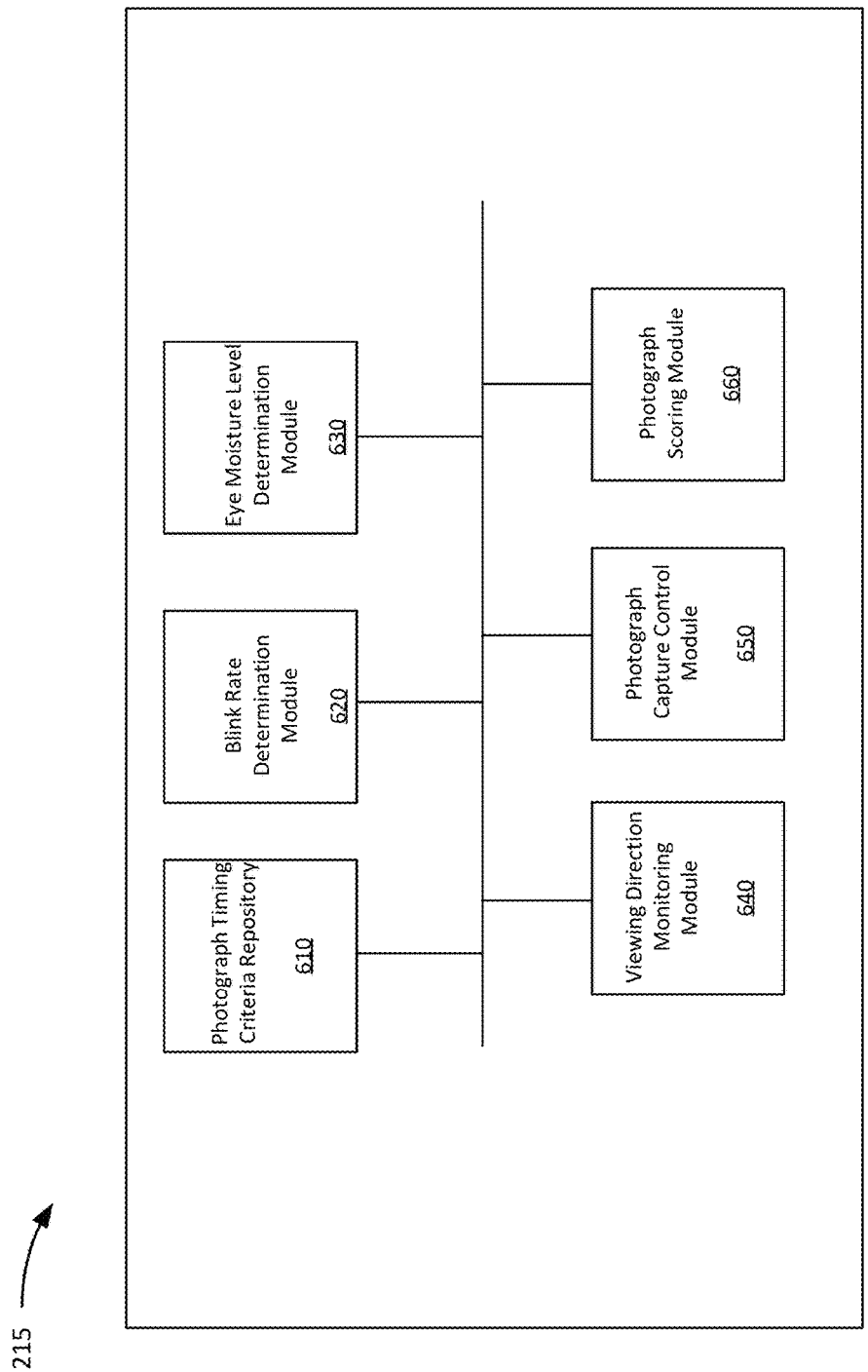
FIG. 6 shows a block diagram of example components of an optimal photograph capture timing component in accordance with aspects of the present invention.

FIG. 6 shows a block diagram of example components of an optimal photograph capture timing component 215 in accordance with aspects of the present invention. As shown in FIG. 6, the optimal photograph capture timing component 215 may include a photograph timing criteria repository 610, a blink rate determination module 620, an eye moisture level determination module 630, a viewing direction monitoring module 640, a photograph capture control module 650, and a photograph scoring module 660. In embodiments, the optimal photograph capture timing component 215 may include additional or fewer components than those shown in FIG. 6. In embodiments, separate components may be integrated into a single computing component or module. Additionally, or alternatively, a single component may be implemented as multiple computing components or modules.

The photograph timing criteria repository 610 may include a data storage device (e.g., storage system 34 of FIG. 1) that receives and stores photograph capture timing criteria (e.g., from a user of camera device 210). In embodiments, the photograph timing criteria repository 610 may receive criteria that are to be met in order for a photograph to be captured. For example, criteria may include eye open/close status, eye moisture level, eye focus status/user viewing direction, etc. More specifically, the criteria may be subdivided at the individual level. For example, the criteria may specify that a photograph should be captured based on the eye open/close status or eye moisture level of only certain individuals. Additionally, or alternatively, the criteria may specify that a photograph should be captured based on the eye open/close status or eye moisture level of portion of individuals (e.g., when 95% of the individuals have eyes open). Additionally, or alternatively, the criteria may specify that tearing or a certain eye moisture level is considered acceptable, or not acceptable. As an example, the criteria may indicate that tearing is "not acceptable" such that photographs are not captured when eye moisture levels exceed a certain threshold. As another example, the criteria may indicate that tearing is "acceptable" such that photographs are captured even when eye moisture levels exceed a threshold representing tearing.

The blink rate determination module 620 may include a program module (e.g., program module 42 of FIG. 1) that determines blink rates for participants in a photograph. For example, the blink rate determination module 620 may determine real-time blink rates based on real-time data by communicating with the wearable devices 220 worn by the participants. Additionally, or alternatively, the blink rate determination module 620 may receive historical blink rates based on historical data stored by the user information server 230 and based on user identification information received by the blink rate determination module 620 from the wearable devices 220. In embodiments, the blink rate determination module 620 may obtain, from the user information server 230, historical blink rate information associated with certain conditions (e.g., weather, time of day, time of year, etc.).

The eye moisture level determination module 630 may include a program module (e.g., program module 42 of FIG. 1) that determines eye moisture levels for participants in a photograph of the camera device 210. For example, the eye moisture level determination module 630 may determine real-time eye moisture levels based on real-time data received from the wearable devices 220 worn by the participants. Additionally, or alternatively, the eye moisture level determination module 630 may receive historical eye moisture levels based on historical data stored by the user information server 230 and based on user identification information received by the blink rate determination module 620 from the wearable devices 220. In embodiments, the blink rate determination module 620 may obtain, from the user information server 230, historical blink rate information associated with certain conditions (e.g., weather, time of day, time of year, etc.).

The viewing direction monitoring module 640 may include a program module (e.g., program module 42 of FIG. 1) that monitors the viewing direction of participants of a photograph. In particular, the viewing direction monitoring module 640 may monitor the viewing direction in order for a determination to be made as to whether the participants are looking at the camera device 210. In embodiments, the viewing direction may be monitored/determined based on directional data received from the wearable devices 220. Additionally, or alternatively, the viewing direction may be monitored/determined based on pixel based classification information and/or facial recognition techniques to determine whether the eyes of the participants are looking at the camera device 210.

The photograph capture control module 650 may include a program module (e.g., program module 42 of FIG. 1) that may control the capturing of a photograph (or a burst of photographs) based on monitoring data, such as the participants' real-time and/or historical blink rates, real-time and/or historical eye moisture levels/patterns, viewing direction, etc. Further, the photograph capture control module 650 may determine a time to capture the photograph based on the photograph capture timing criteria. As an example, the photograph capture control module 650 may determine a time to capture the photograph when all participants' eyes are open (e.g., not blinking) based on the blink rate patterns of the participants (or when a certain percentage of participants' eyes are open). Additionally, or alternatively, the photograph capture control module 650 may determine a time to capture the photograph when the participants are looking at the camera, and/or when the eye moisture levels satisfy a threshold level (e.g., as defined by the criteria). In embodiments, the photograph capture control module 650 may capture a group or a burst of photographs when the criteria have been met.

The photograph scoring module 660 may include a program module (e.g., program module 42 of FIG. 1) that may analyze and score the group of photographs captured by the photograph capture control module 650 after the photograph capture timing criteria have been met. For example, the photograph scoring module 660 may generate scores for each photograph in the group of photographs based on the criteria and the attributes of the photographs (e.g., participant eye open/close statuses, participant eye moisture levels, participant view direction/focus on camera device 210 statuses, etc.). The scores may represent a degree to which the photographs satisfy the criteria. For example, if the criteria specified that all the participants' eyes should be open, the photograph scoring module 660 may score the photographs containing participants eyes open higher than photographs containing participants whose eyes were closed. The photograph scoring module 660 may determine the attributes of the photographs based on image analysis/pixel-based classification techniques. Additionally, or alternatively, the photograph scoring module 660 may determine the attributes of the photographs based on data from the wearable devices 220. For example, the wearable devices 220 may provide data indicating the eye open/close status, moisture levels, viewing direction, etc. at various points in time. In embodiments, the scores may be numerical values on a scale (e.g., a scale of 0-100 in which 100 is the highest degree of criteria satisfaction). As described herein, photographs may be presented to the user in order of score (e.g., via a display of the camera device 210) and the user may select which photographs to retain, delete, share to image hosting server 240, or provide to another device for storage. In embodiments, the photograph scoring module 660 may score each photograph in the burst of photographs as a secondary verification step to verify that the photographs match the defined criteria.

Figure 7:
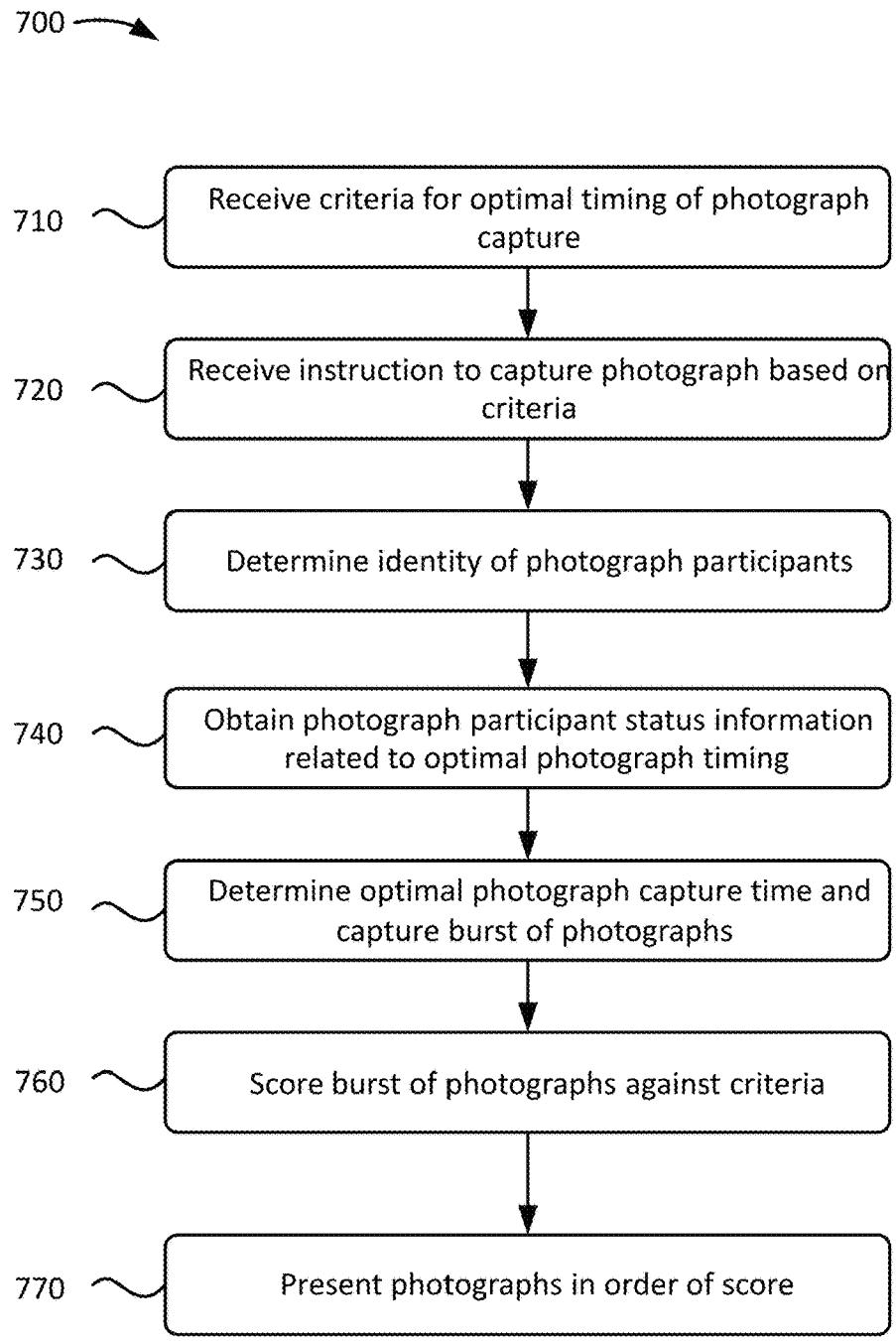
FIG. 7 shows an example flowchart for capturing a photograph at an optimal time based on blink rate, eye moisture level, and/or other criteria in accordance with aspects of the present invention.

FIG. 7 shows an example flowchart of a process for capturing a photograph at an optimal time based on blink rate, eye moisture level, and/or other criteria. The steps of FIG. 7 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 7, process 700 may include receiving criteria for optimal timing of photograph capture (step 710). For example, as described above with respect to the photograph timing criteria repository 610, the optimal photograph capture timing component 215 may receive and store photograph capture timing criteria (e.g., from a user of camera device 210). In embodiments, the optimal photograph capture timing component 215 may receive criteria that are to be met in order for a photograph to be captured. For example, criteria may include eye open/close status, eye moisture level, eye focus status/user viewing direction, etc.

Process 700 may further include receiving an instruction to capture a photograph based on the criteria (step 720). For example, the optimal photograph capture timing component 215 may receive an instruction to capture a photograph based on the criteria via a user interface of the camera device 210. In embodiments, the camera device 210 may present an option to capture a photograph at an optimal time (e.g., versus simply capturing the photograph when a photograph capture button is pressed). The user may select to capture the photograph with the optimal timing option once the camera device 210 has been focused on one or more users to be photographed. In embodiments, the camera device 210 may receive an instruction to delay the capture of the photograph (e.g., to provide the opportunity for the user to position themselves into the field of view of the camera device 210 in order to be included in the photograph).

Process 700 may also include determining the identity of photograph participants (step 730). For example, the optimal photograph capture timing component 215 may determine the photograph participants (e.g., the individuals in the field of view of the camera device 210 or within a boundary of photograph to be captured). For example, the optimal photograph capture timing component 215 may determine the identity of the photograph participants based on receiving user identification information via communicating with wearable devices 220 worn by the participants. Additionally, or alternatively, the camera device 210 may use facial recognition techniques to identify the photograph participants. In embodiments, the camera device 210 may use proximity and visibility fencing techniques to filter out data communicated by wearable devices 220 worn by individuals that are not participants in a photograph. For example, the camera device 210 may determine that certain wearable devices 220 are worn by non-participants by comparing a photography boundary with the proximity of the non-participant as determined by location information deciphered by communications activity between the wearable devices 220 and the camera device 210 (e.g., signal strength information, viewing direction, etc.). Further, the optimal photograph capture timing component 215 may match participant faces to user identification information received from the wearable devices 220 based on proximity and/or fine location data.

Process 700 may further include obtaining photograph participant status information related to optimal photograph timing (step 740). For example, as described above with respect to the blink rate determination module 620, the eye moisture level determination module 630, and the viewing direction monitoring module 640, the optimal photograph capture timing component 215 may obtain photograph participant status information, such as real-time and/or historical blink rate information, real-time and/or historical eye moisture level information, viewing direction information, etc. In this way, the optimal photograph capture timing component 215 may monitor the status of the photograph participants (e.g., by monitoring the participants' eyes open/close status based on blink rates, eye moisture levels, etc.).

Process 700 may also include determining an optimal photograph capture time and capturing a burst of photographs (step 750). For example, as described above with respect to the photograph capture control module 650, the optimal photograph capture timing component 215 may determine a time to capture the photograph based on the photograph capture timing criteria and the participant data related to optimal photograph timing (as obtained in step 740). As an example, the optimal photograph capture timing component 215 may determine a time to capture the photograph when all participants' eyes are open (e.g., not blinking) based on the blink rate patterns of the participants (or when a certain percentage of participants' eyes are open). Additionally, or alternatively, the optimal photograph capture timing component 215 may determine a time to capture the photograph when the participants are looking at the camera, and/or when the eye moisture levels satisfy a threshold level (e.g., as defined by the criteria). In short, the optimal photograph capture timing component 215 may monitor the status of the photograph participants and capture a group or a burst of photographs after detecting that the criteria have been met. In embodiments, the optimal photograph capture timing component 215 may capture the burst of photographs without additional user action (e.g., beyond an initial instruction to capture the photograph at an optimal time as received in step 720).

Process 700 may further include scoring the burst of photographs against the criteria (step 760). For example, as described above with respect to the photograph scoring module 660, the optimal photograph capture timing component 215 may analyze and score the group of photographs captured by the optimal photograph capture timing component 215 after the photograph capture timing criteria have been met. For example, the optimal photograph capture timing component 215 may generate scores for each photograph in the group of photographs based on the criteria and the attributes of the photographs (e.g., participant eye open/close statuses, participant eye moisture levels, participant view direction/focus on camera device 210 statuses, etc.). The scores may represent a degree to which the photographs satisfy the criteria.

Process 700 may also include presenting the photographs in order of score (step 770). For example, as described above with respect to the photograph capture control module 650, the optimal photograph capture timing component 215 may present the photographs to the user in order of score (e.g., via a display of the camera device 210). The user may then select which photographs to retain, delete, share to image hosting server 240, or provide to another device for storage. In embodiments, the photographs may also be tagged with the participants identified (e.g., based on the identification of the participants at step 730). In embodiments, one or more of the photographs in the burst of photographs may be automatically shared via the image hosting server 240 when the score meets a threshold (e.g., when the criteria of the photograph(s) have been met to a certain degree).

In an alternative embodiment, the optimal photograph capture timing component 215 may not automatically take a photograph when the criteria is met, but may notify the user that the criteria has been met (e.g., via a visual and/or audible notification, a countdown to when the criteria is predicted to be met, etc.).

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by a computing device, criteria for timing a capture of a photograph by an associated camera device;
    receiving, by the computing device, an instruction to capture the photograph at a time determined based on the criteria;
    obtaining, by the computing device, information regarding a real-time blink rate and a real-time eye moisture level of one or more photograph participants from one or more smart contact lenses worn by the one or more photograph participants;
    determining, by the computing device, the time to capture the photograph based on the criteria and the real-time blink rate and the real-time moisture level of the one or more photograph participants;
    determining, by the computing device, respective identities of each of the one or more photograph participants;
    determining, by the computing device, historical blink rate information and historical eye moisture level patterns of each of the one or more photograph participants based on the identities; and
    capturing, by the computing device, the photograph at the determined time,
    wherein the determining the time to capture the photograph is further based on the historical blink rate information and the historical eye moisture level patterns.

2. The method of claim 1, further comprising:
    capturing a burst of a plurality of photographs at the determined time;
    scoring each of the plurality of photographs based on the criteria, wherein the scores represents a degree to which the one or more photographs match the criteria.

3. The method of claim 2, further comprising automatically sharing a subset of the plurality of photographs to a photograph host server based on the scores satisfying a threshold.

4. The method of claim 3, wherein the subset of the plurality of photographs identifies the participants,
    wherein the criteria includes at least one selected from the group consisting of:
        eye open/close status of the one or more photograph participants;
        facial/emotional expressions of the one or more photograph participants;
        eye moisture level of the one or more photograph participants;
        eye focus direction of the one or more photograph participants; and
        eye focus status of the one or more photograph participants,
    wherein the determining the time to capture the photograph includes determining that a real-time status of the one or more photograph participants matches the criteria, and
    wherein the capturing the photograph at the determined time includes capturing the photograph when the one or more photograph participants eyes are open.

5. The method of claim 2, further comprising presenting the plurality of photographs in order of score.

6. The method of claim 1, wherein determining the time to capture the photograph prevents or permits the photograph to be captured when the photograph participants' eyes are closed.

7. The method of claim 1, wherein a service provider at least one of creates, maintains, deploys and supports the computing device.

8. The method of claim 1, wherein the receiving the criteria, the receiving the instruction, the obtaining, the determining, and the capturing are provided by a service provider on a subscription, advertising, and/or fee basis.

9. The method of claim 1, wherein the computing device includes software provided as a service in a cloud environment.

10. The method of claim 1, further comprising deploying a system for optimizing the timing for photographing the one or more photograph participants, comprising providing a computer infrastructure operable to perform the receiving the criteria, the receiving the instruction, the obtaining, the determining, and the capturing.

11. A computer program product for optimizing the timing for photographing one or more photograph participants, the computer program product comprising a computer readable storage medium having program instructions embodied therewith, the program instructions executable by a computing device to cause the computing device to:
    receive criteria for timing a capture of a photograph by an associated camera device;
    receive an instruction to capture the photograph based on satisfaction of the criteria;
    monitor a real-time blink rate and a real-time eye moisture level of one or more photograph participants based on information received from one or more smart contact lenses worn by the one or more photograph participants;
    detect that the real-time blink rate and a real-time eye moisture level of the one or more photograph participants satisfy the criteria;
    determine respective identities of each of the one or more photograph participants;
    determine historical blink rate information and historical eye moisture level patterns of each of the one or more photograph participants based on the identities; and
    capture the photograph based on the detecting,
    wherein the detecting is further based on the historical blink rate information and the historical eye moisture level patterns.

12. The computer program product of claim 11, wherein the program instructions further cause the computing device to:
    capture a plurality of photographs based on the detecting;
    score each of the plurality of photographs based on the criteria, wherein the scores represents a degree to which the one or more photographs match the criteria; and
    present the plurality of photographs in order of score.

13. A system comprising:
- a CPU, a computer readable memory and a computer readable storage medium associated with a computing device;
- program instructions to receive criteria for timing a capture of a photograph by an associated camera device;
- program instructions to receive an instruction to capture the photograph based on satisfaction of the criteria;
- program instructions to monitor a real-time blink rate and a real-time eye moisture level of one or more photograph participants based on information received from smart contact lenses worn by the one or more photograph participants;
- program instructions to detect that the real-time blink rate and a real-time eye moisture level of the one or more photograph participants satisfy the criteria;
- program instructions to determine respective identities of each of the one or more photograph participants;
- program instructions to determine historical blink rate information and historical eye moisture level patterns of each of the one or more photograph participants based on the identities; and
- program instructions to provide an alert indicating that the criteria have been met based on the detecting,
- wherein the detecting is further based on the historical blink rate information and the historical eye moisture level patterns, and
- the program instructions are stored on the computer readable storage medium for execution by the CPU via the computer readable memory.

* * * * *